US009415457B2

(12) United States Patent
Daniel et al.

(10) Patent No.: US 9,415,457 B2
(45) Date of Patent: Aug. 16, 2016

(54) METHOD TO CONTROL AN ARC WELDING SYSTEM TO REDUCE SPATTER

(75) Inventors: Joseph A. Daniel, Sagamore Hills, OH (US); Stephen Cole, Bonita, CA (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 727 days.

(21) Appl. No.: 13/267,153

(22) Filed: Oct. 6, 2011

(65) Prior Publication Data

US 2012/0097655 A1 Apr. 26, 2012

Related U.S. Application Data

(60) Provisional application No. 61/405,895, filed on Oct. 22, 2010, provisional application No. 61/413,007, filed on Nov. 12, 2010.

(51) Int. Cl.
*B23K 9/09* (2006.01)
*B23K 9/10* (2006.01)
*B23K 9/095* (2006.01)

(52) U.S. Cl.
CPC ................ *B23K 9/091* (2013.01); *B23K 9/095* (2013.01); *B23K 9/1043* (2013.01)

(58) Field of Classification Search
CPC ........ B23K 9/0728; B23K 9/09; B23K 9/092; B23K 9/06; B23K 9/091
USPC ........................ 219/136–137 PS, 129–130.51
See application file for complete search history.

(56) References Cited

U.S. PATENT DOCUMENTS 4,288,682 A * 9/1981 Toth ........................ 219/137.71
4,544,826 A 10/1985 Nakanishi et al.
4,835,360 A 5/1989 Parks et al.
4,885,453 A * 12/1989 Martin ........................ 219/136
4,889,969 A * 12/1989 Kawai et al. ............. 219/130.51
4,954,691 A * 9/1990 Parks et al. ............. 219/137 PS (Continued)

FOREIGN PATENT DOCUMENTS

CN 1942279 A 4/2007
CN 101058124 A 10/2007

(Continued)

OTHER PUBLICATIONS

PCT/IB2011/002532 International Searching Authority Report and Written Opinion, Sep. 12, 2012.

(Continued)

*Primary Examiner* — Sang Y Paik

(74) *Attorney, Agent, or Firm* — Calfee, Halter & Griswold LLP

(57) ABSTRACT

An electric arc welder and a method for performing a pulse welding process producing reduced spatter. The welder produces a current between an advancing electrode and a workpiece. The welder includes a short-detecting capability for detecting a short condition upon occurrence of a short circuit between the advancing electrode and the workpiece. The welder may also include a switching module in the welding circuit path of the welder having an electrical switch and a resistive path. Times of occurrence of short intervals can be tracked and a blanking signal can be generated based on the tracked short intervals to anticipate a next short interval in a next pulse period of the pulsed welding process. The blanking signal can be used to reduce a welding current in the welding circuit path by introducing additional resistance into the welding circuit path via the switching module, for example.

23 Claims, 9 Drawing Sheets

(56) References Cited

U.S. PATENT DOCUMENTS

| | | | | |
|---|---|---|---|---|
| 5,270,516 | A | 12/1993 | Hamamoto et al. | |
| 7,102,099 | B2 * | 9/2006 | Huismann et al. | 219/130.51 |
| 7,304,269 | B2 * | 12/2007 | Fulmer et al. | 219/130.51 |
| 7,705,270 | B2 * | 4/2010 | Norrish et al. | 219/137.71 |
| 8,502,114 | B2 | 8/2013 | Hirota et al. | |
| 8,592,720 | B2 | 11/2013 | Nishisaka et al. | |
| 9,162,308 | B2 | 10/2015 | Peters | |
| 2009/0152252 | A1 | 6/2009 | Kawamoto et al. | |
| 2010/0176104 | A1 * | 7/2010 | Peters et al. | 219/130.21 |

FOREIGN PATENT DOCUMENTS

| | | | |
|---|---|---|---|
| CN | 102056699 | A | 5/2011 |
| EP | 1745880 | A2 | 1/2007 |
| JP | 61229471 | | 5/1987 |
| WO | 2012052839 | A2 | 4/2012 |
| WO | 2013050844 | A1 | 4/2013 |
| WO | 2013068813 | A1 | 5/2013 |

OTHER PUBLICATIONS

Second Notice of Opinion on Examination from Chinese Patent Application No. 201280059973.1 dated Nov. 4, 2015.

Third Notice of Opinion on Examination from Chinese Patent Application No. 201180062536.0 dated Oct. 30, 2015.

Second Office Action from Chinese Patent Application No. 201280066440.6 dated Dec. 1, 2015.

* cited by examiner 100
input power
power converter
120
switching module
140
110
121
122
E
W
130
voltage feedback
160
161
current feedback
150
162
high-speed controller
170
172
171
waveform generator
180
181

500
510
510
510
520
530
540
short interval 700
710
710
710
750
730
720
740
short interval 900
910
910
910
950
930
920
940
short interval
172
blanking signal
960
blanking interval

METHOD TO CONTROL AN ARC WELDING SYSTEM TO REDUCE SPATTER

This U.S. Patent Application claims priority to and the benefit of U.S. Provisional Patent Application Ser. No. 61/405,895 filed on Oct. 22, 2010, which is incorporated herein by reference in its entirety.

This U.S. Patent Application claims priority to and the benefit of U.S. Provisional Patent Application Ser. No. 61/413,007 filed on Nov. 12, 2010, which is incorporated herein by reference in its entirety.

The preferred embodiment section and the drawings of U.S. Pat. No. 7,304,269 issued on Dec. 4, 2007 are incorporated by reference herein.

TECHNICAL FIELD

Certain embodiments relate to pulsed electric arc welding equipment and processes. More particularly, certain embodiments relate to anticipating or reacting to short circuits formed between a welding electrode and a workpiece during a pulsed electric arc welding process by reducing the output current during the time of the short to reduce spatter.

BACKGROUND

In electric arc welding, a popular welding process is pulse welding which primarily uses a solid wire electrode with an outer shielding gas. MIG welding uses spaced pulses which first melt the end of an advancing wire electrode and then propels the molten metal from the end of the wire through the arc to the workpiece. A globular mass of molten metal is transferred during each pulse period of the pulse welding process. During certain pulse periods, especially in applications where the welding electrode operates very close to the workpiece, molten metal contacts the workpiece before being entirely released from the advancing wire electrode. This creates a short circuit (a.k.a., a short) between the advancing wire electrode and the workpiece. It is desirable to eliminate or clear the short rapidly to obtain the consistency associated with proper pulse welding. However, clearing a short can result in undesirable spatter being generated. Such spatter causes inefficiencies in the welding process and can result in molten metal being spattered over the workpiece which may have to be removed later using a grinding tool, for example.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

Embodiments of the present invention comprise an electric arc welding system and methods for reducing spatter during a pulsed electric arc welding process. Spatter is reduced during a welding operation by reducing the welding output current during a time when a short occurs between the welding electrode and the workpiece. In one embodiment, a switching module, including an electrical switch and a resistive path, is incorporated into the return welding current path of a power source of the electric arc welding system. During non-shorting conditions of the pulse welding operation, the electrical switch is closed or on, allowing welding current to freely return to the power source by experiencing minimal resistance through the switch. However, when a short is anticipated or occurs during the welding process, the electrical switch is opened or turned off, forcing the welding current to have to go through the resistive path of the switching module, causing the level of the welding current to be lower than it otherwise would be. The lower current generated during the short interval results in less spatter being created when the short is cleared. The time of occurrence of a short during the pulse periods may be tracked and a blanking interval, overlapping the interval of time corresponding to an anticipated short, may be applied such that the switch is open during the blanking interval.

These and other features of the claimed invention, as well as details of illustrated embodiments thereof, will be more fully understood from the following description and drawings.

DETAILED DESCRIPTION

During an arc-welding process, when the distance between the tip of the electrode and the workpiece is relatively small, molten metal may be transferred via a contact transfer process (e.g., a surface-tension-transfer or STT process) or a free-flight transfer process (e.g., a pulsed welding process) with a tethered connection. In a contact transfer process, a molten metal ball on the tip of the welding electrode makes contact with the workpiece (i.e., shorts) and starts to "wet into" the molten puddle on the workpiece before the molten metal ball begins to substantially separate from the tip of the electrode.

Figure 6:
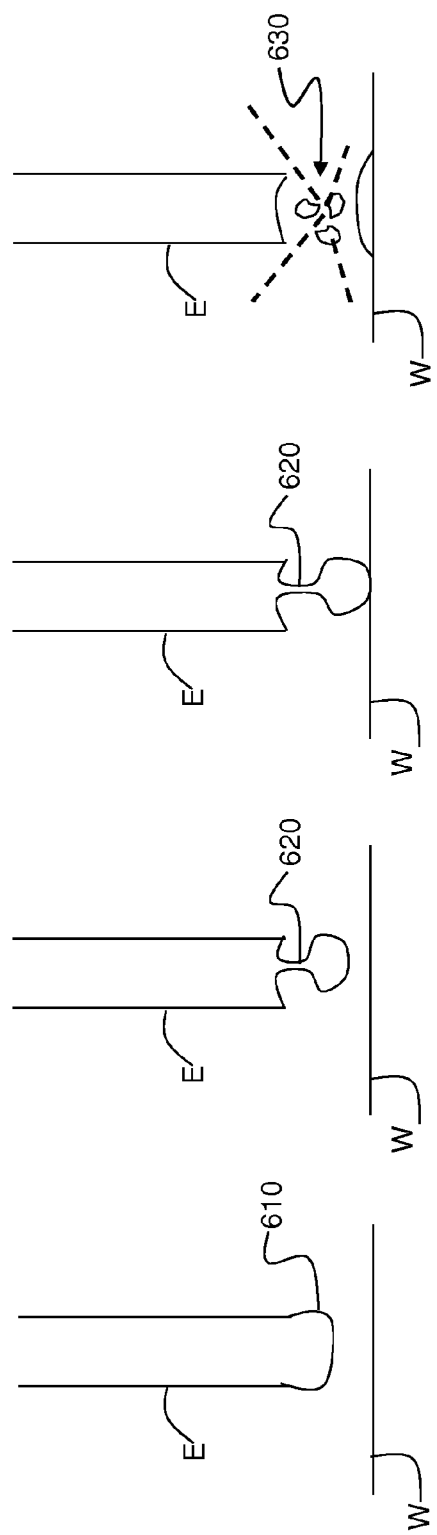
FIG. 6 illustrates the exploding spatter process discovered using high speed video technology in a free-flight transfer process having a tethered connection.

In a free-flight transfer process, the molten metal ball breaks free of the tip of the electrode and "flies" across the arc toward the workpiece. However, when the distance between the tip of the electrode and the workpiece is relatively short, the molten metal ball flying across the arc can make contact with the workpiece (i.e., short) while a thin tether of molten metal still connects the molten metal ball to the tip of the electrode. In such a tethered free-flight transfer scenario, the thin tether of molten metal tends to explode, causing spatter, when the molten metal ball makes contact with the workpiece as illustrated in FIG. 6 herein, due to a rapid increase in current through the tether.

Figure 1:
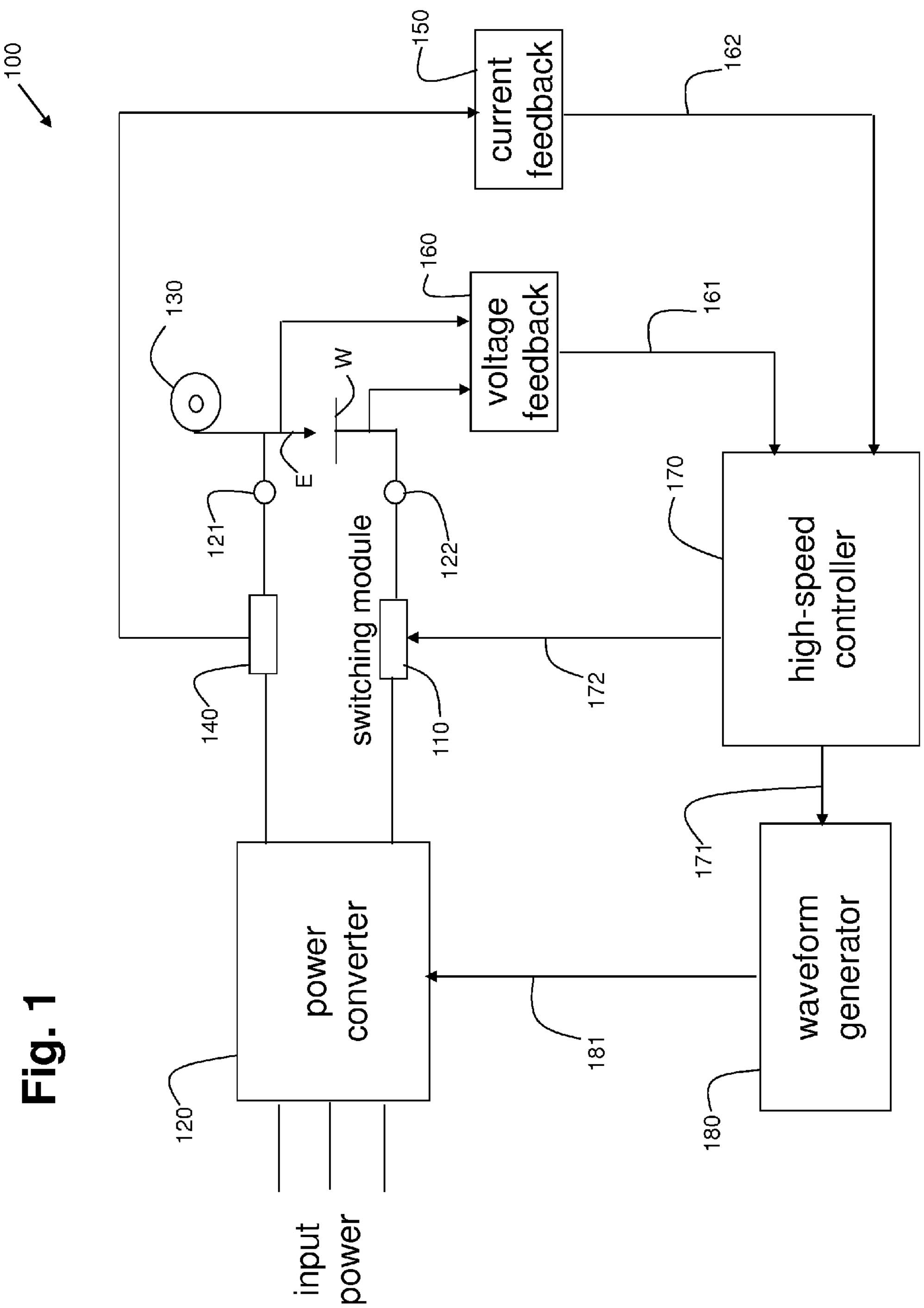
FIG. 1 illustrates a block diagram of an example embodiment of an electric arc welding system incorporating a switching module in a welding current return path.

FIG. 1 illustrates a block diagram of an example embodiment of an electric arc welding system 100 incorporating a switching module 110 in a welding output return path and providing welding outputs 121 and 122. The system 100 includes a power converter 120 capable of converting an input power to a welding output power. The power converter 120 may be an inverter-type power converter or a chopper-type power converter, for example. The system 100 further includes a wire feeder 130 capable of feeding a welding electrode wire E through, for example, a welding gun (not shown) that connects the welding electrode wire E to the welding output 121.

The system 100 also includes a current shunt 140 operatively connected between the power converter 120 and the welding output 121 for feeding welding output current to a current feedback sensor 150 of the system 100 to sense the welding output current produced by the power converter 120. The system 100 further includes a voltage feedback sensor 160 operatively connected between the welding output 121 and the welding output 122 for sensing the welding output voltage produced by the power converter 120. As an alternative, the switching module 110 could be incorporated in the outgoing welding current path, for example, between the power converter 120 and the current shunt 140, or between the current shunt 140 and the welding output 121.

The system 100 also includes a high-speed controller 170 operatively connected to the current feedback sensor 150 and the voltage feedback sensor 160 to receive sensed current and voltage in the form of signals 161 and 162 being representative of the welding output. The system 100 further includes a waveform generator 180 operatively connected to the high speed controller 170 to receive command signals 171 from the high speed controller 170 that tell the waveform generator how to adapt the welding waveform signal 181 in real time. The waveform generator 180 produces an output welding waveform signal 181 and the power converter 120 is operatively connected to the waveform generator 180 to receive the output welding waveform signal 181. The power converter 120 generates a modulated welding output (e.g., voltage and current) by converting an input power to a welding output power based on the output welding waveform signal 181.

The switching module 110 is operatively connected between the power converter 120 and the welding output 122 which is connected to the welding workpiece W during operation. The high speed controller 170 is also operatively connected to the switching module 110 to provide a switching command signal (or a blanking signal) 172 to the switching module 110. The high speed controller 170 may include logic circuitry, a programmable microprocessor, and computer memory, in accordance with an embodiment of the present invention.

In accordance with an embodiment of the present invention, the high-speed controller 170 may use the sensed voltage signal 161, the sensed current signal 162, or a combination of the two to determine when a short occurs between the advancing electrode E and the workpiece W, when a short is about to clear, and when the short has actually cleared, during each pulse period. Such schemes of determining when a short occurs and when the short clears are well known in the art, and are described, for example, in U.S. Pat. No. 7,304,269, portions of which are incorporated herein by reference. The high-speed controller 170 may command the waveform generator 180 to modify the waveform signal 181 when the short occurs and/or when the short is cleared. For example, when a short is determined to have been cleared, the high-speed controller 170 may command the waveform generator 180 to incorporate a plasma boost pulse (see pulse 750 of FIG. 7) in the waveform signal 181 to prevent another short from occurring immediately after the clearing of the previous short.

Figure 2:
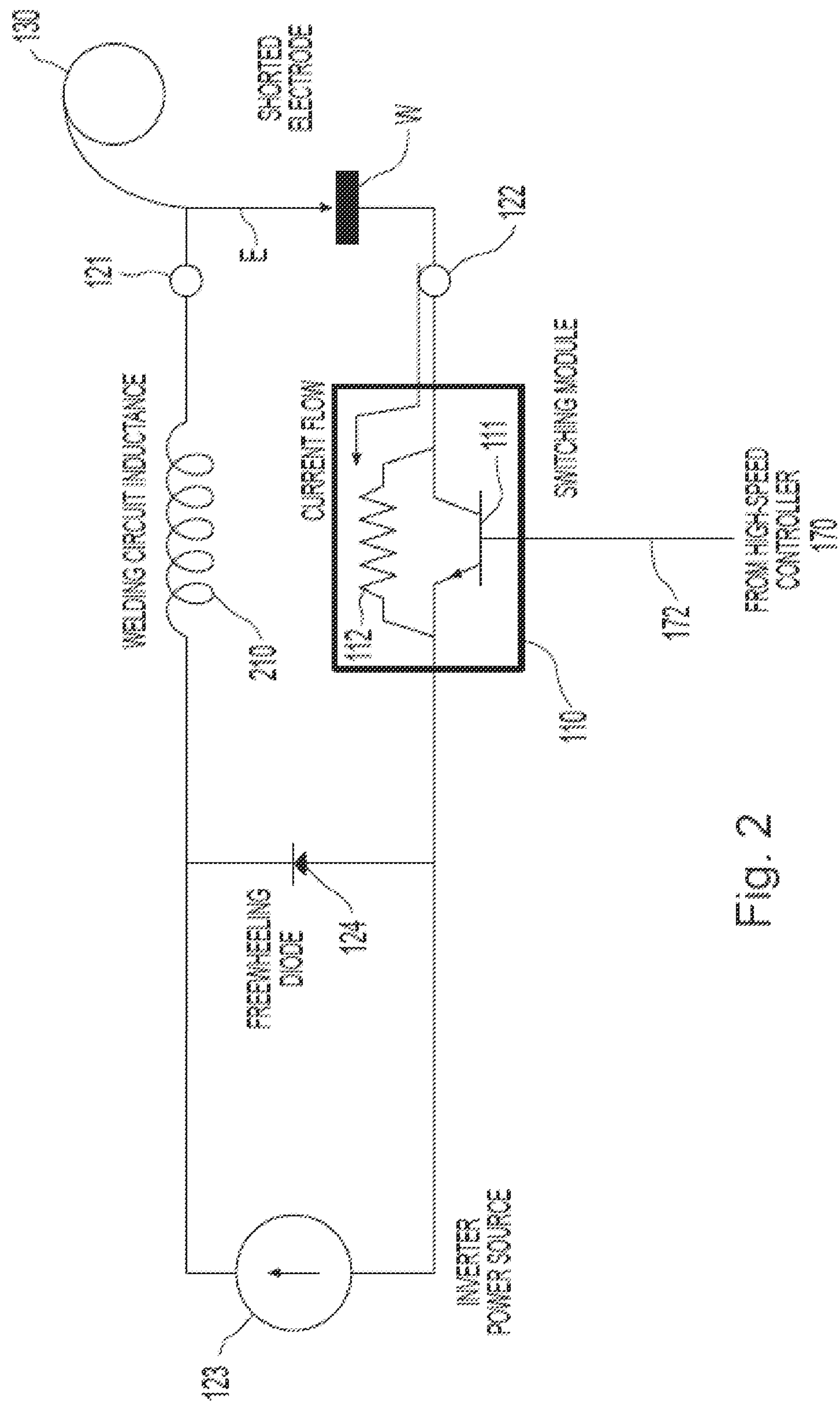
FIG. 2 illustrates a diagram of an example embodiment of a portion of the system of FIG. 1, including the switching module in the welding current return path.

FIG. 2 illustrates a diagram of an example embodiment of a portion of the system 100 of FIG. 1, including the switching module 110 in the welding current return path. The power converter 120 may include an inverter power source 123 and a freewheeling diode 124. The welding output path will have an inherent welding circuit inductance 210 due to the various electrical components within the welding output path. The switching module 110 is shown as having an electrical switch 111 (e.g., a power transistor circuit) in parallel with a resistive path 112 (e.g., a network of high power rated resistors).

During a pulse period of the welding waveform, when no short is present, the electrical switch 111 is commanded to be closed by the switching command signal 172 from the high-speed controller 170. When the electrical switch 111 is closed, the electrical switch 111 provides a very low resistance path in the output welding return path, allowing welding current to freely return to the power converter 120 through the switch 111. The resistive path 112 is still present in the welding output return path, but most of the current will flow through the low resistance path provided by the closed switch 111. However, when a short is detected, the electrical switch 111 is commanded to be opened by the switching command signal 172 from the high-speed controller 170. When the electrical switch 111 is opened, current is cut off from flowing through the switch 111 and is forced to flow through the resistive path 112, resulting in the level of the current being reduced due to the resistance provided by the resistive path 112.

Figure 3:
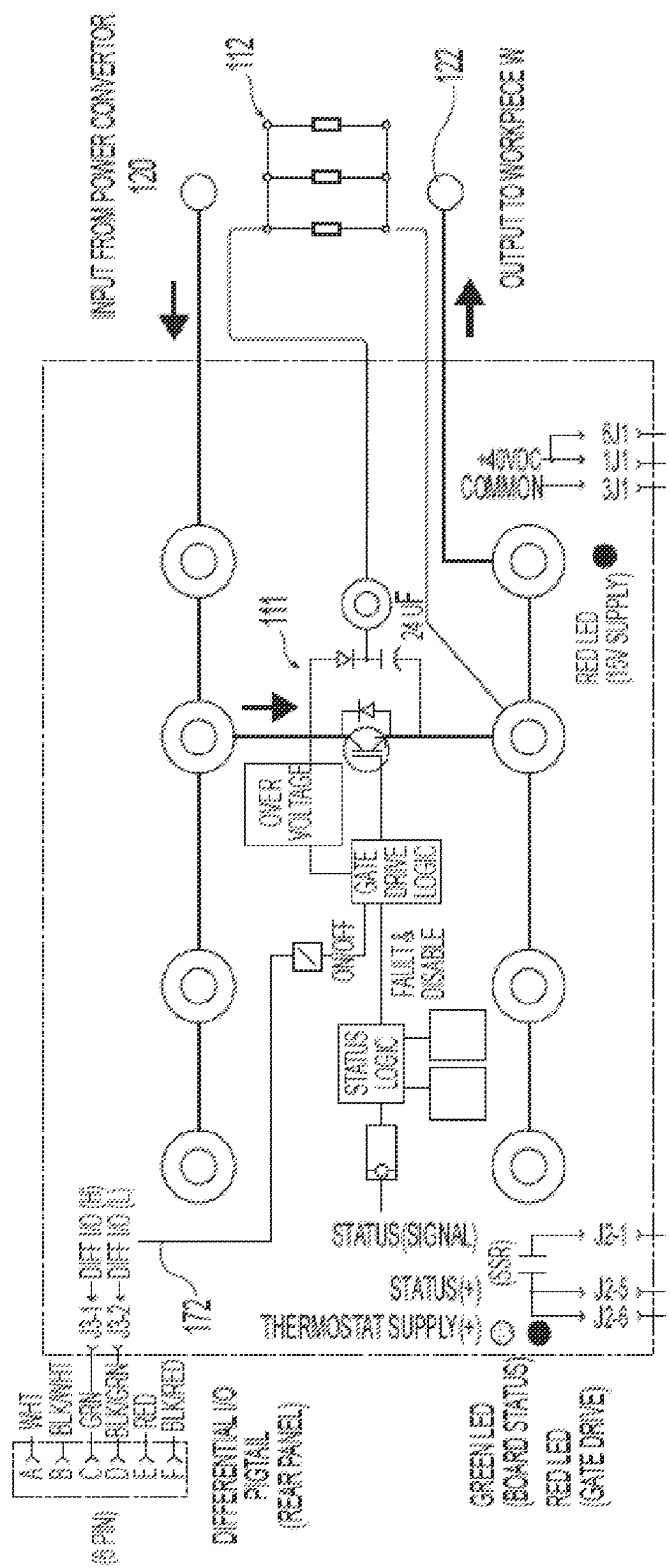
FIG. 3 illustrates a schematic diagram of an example embodiment of the switching module of FIG. 1 and FIG. 2.

FIG. 3 illustrates a schematic diagram of an example embodiment of the switching module 110 of FIG. 1 and FIG. 2. The switching module 110 includes the transistor circuit 111 and the resistor network 112 as shown. The switching module 110 may include a circuit board for mounting the various electrical components of the module 110 including the transistor circuit 111, the resistor network 112, LEDs, and status logic circuitry, for example.

Figure 4:
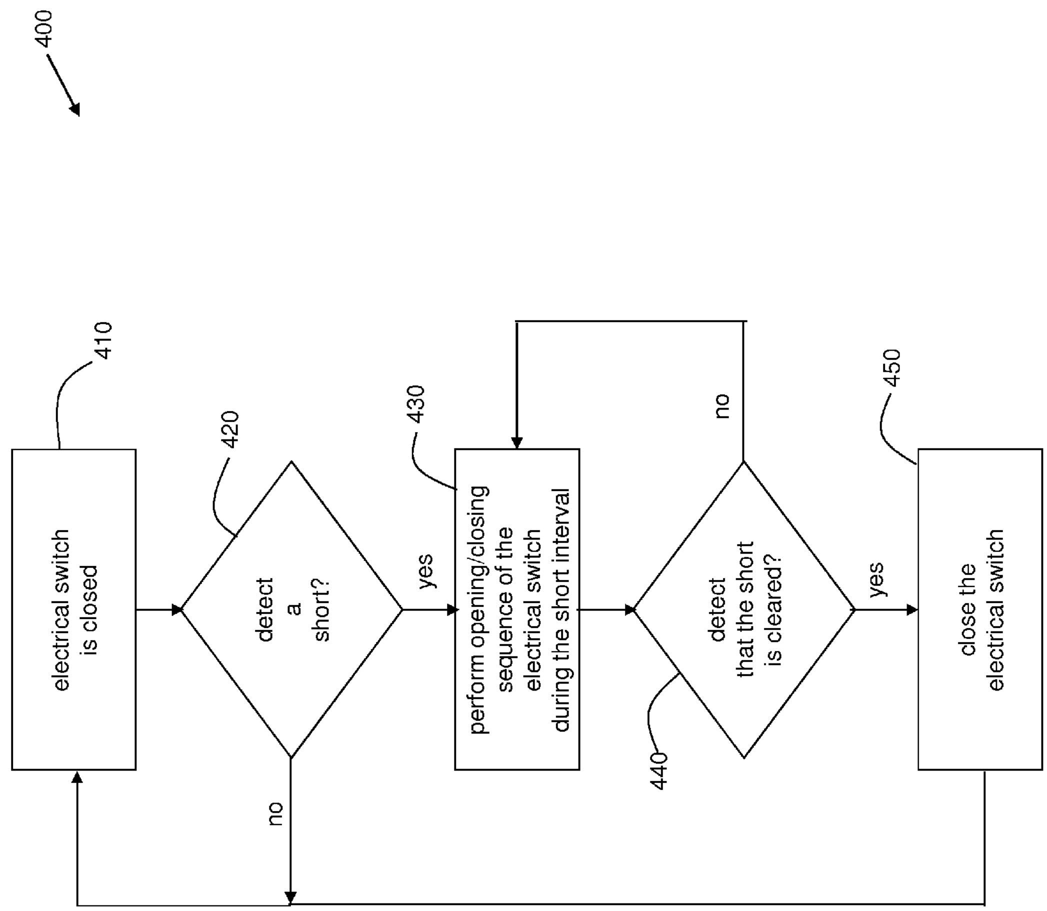
FIG. 4 illustrates a flowchart of a first example embodiment of a method for preventing spatter in a pulsed electric arc welding process using the system of FIG. 1.

FIG. 4 illustrates a flowchart of a first example embodiment of a method 400 for preventing spatter in a pulsed electric arc welding process using the system 100 of FIG. 1. Step 410 represents operation where the switch 111 of the switching module 110 is normally closed (no short condition). In step 420, if a short is not detected, then the switch 111 remains closed (no short condition). However, if a short is detected then, in step 430, the switch 111 is commanded to go through an opening and closing sequence during the short interval (i.e., the time period over which the electrode is shorted to the workpiece).

The opening/closing sequence in step 430 starts by opening the switch 111 when the short is first detected. The switch 111 remains open for a first period of time (e.g., a first 10% of the short interval). This decreases the output current quickly so the short does not break right away causing a large amount of spatter. After the first period of time, the switch is again closed and the output current is ramped during a second period of time to cause the molten short to begin to form a narrow neck in an attempt to break free from the electrode and clear the short. During this second period of time, as the current is ramping, a dv/dt detection scheme is performed to anticipate when the short will clear (i.e., when the neck will break). Such a dv/dt scheme is well known in the art. The switch 111 is then opened again just before the short is about to clear (e.g., during the last 10% of the short interval) in order to quickly lower the output current once again to prevent excessive spattering when the neck actually breaks (i.e., when the short actually clears).

In step 440, if the short (short between the electrode and the workpiece) is still present, then the switch 111 remains open. However, if the short has been cleared then, in step 450, the switch 111 is again closed. In this manner, during a short condition, the switch 111 goes through an opening/closing sequence and the current flowing through the welding output path is reduced when the switch is open, resulting in reduced spatter. The method 400 is implemented in the high-speed controller 170, in accordance with an embodiment of the present invention. Furthermore, in accordance with an embodiment of the present invention, the system 100 is able to react at a rate of 120 kHz (i.e., the switching module 110 can be switched on and off at this high rate), providing sufficient reaction to detection of a short and detection of the clearing of the short to implement the method 400 in an effective manner.

In accordance with a somewhat simpler alternative embodiment, instead of going through the opening/closing sequence described above with respect to FIG. 4, the current of the welding circuit path is decreased, in response to detection of a short between the advancing wire electrode and the workpiece, by opening the switch 111 for at least a determined period of time, thus increasing the resistance in the welding circuit path. For most pulse periods, the determined period of time is of a duration allowing for the short to clear without having to first increase the current of the welding circuit path. During a given pulse period, if the short clears before the determined period of time has expired as desired, then the process proceeds to the next part of the pulse period. However, if the short does not clear within the predetermined period of time then, immediately after the determined period of time, the switch 111 is closed again, causing the current of the welding circuit path to once again increase and clear the short. In such an alternative embodiment, the switch 111 is simply opened for at least part of the determined period of time in response to the detection of the short. In most pulse periods, the current does not have to be increased to clear the short.

Furthermore as an option, when the short between the advancing wire electrode and the workpiece is detected, a speed of the advancing wire electrode can be slowed. Slowing the speed of the advancing wire electrode helps to clear the short more readily by not adding as much material to the short as otherwise would be added. To slow the speed of the advancing wire electrode, a motor of a wire feeder advancing the wire electrode may be switched off and a brake may be applied to the motor. The brake may be a mechanical brake or an electrical brake, in accordance with various embodiments.

Figure 5:
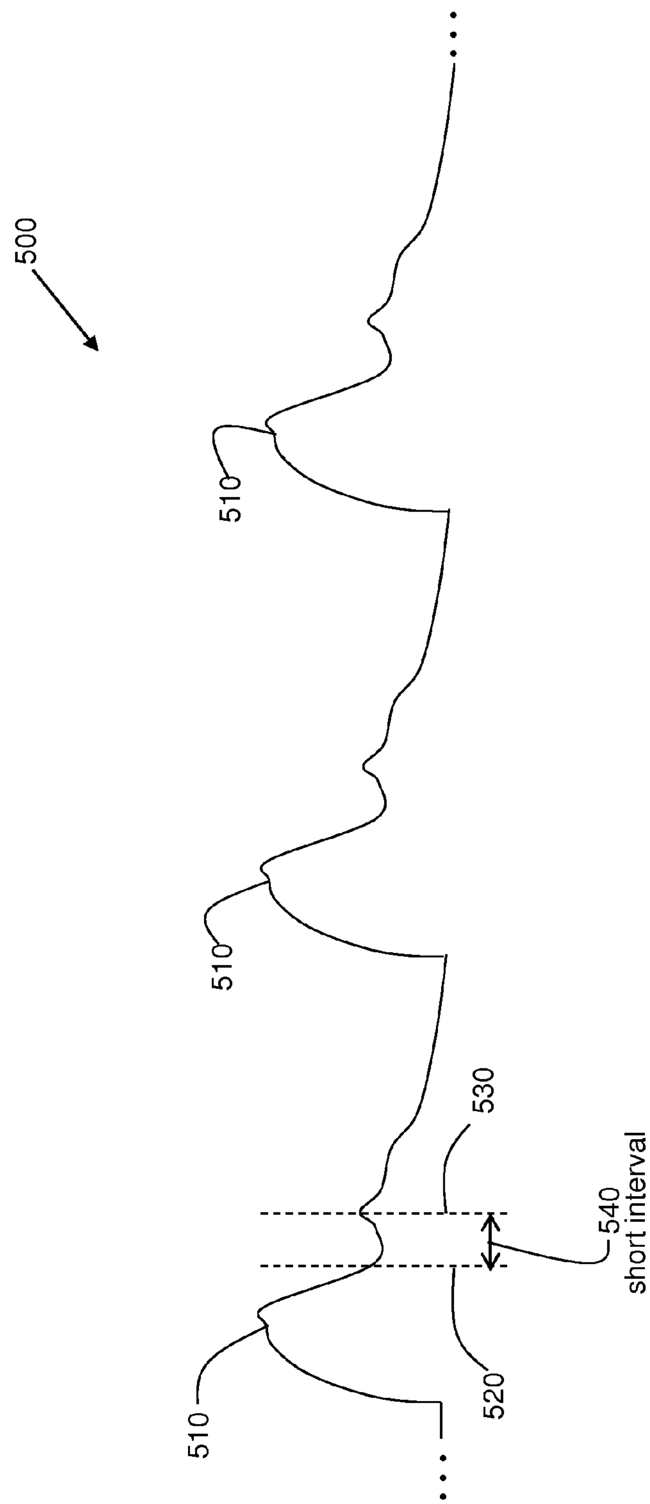
FIG. 5 illustrates an example of a conventional pulsed output current waveform resulting from a conventional pulsed electric arc welder that does not use the switching module of FIGS. 1-3 in accordance with the method of FIG. 4.

FIG. 5 illustrates an example of a conventional pulsed output current waveform 500 resulting from a conventional pulsed electric arc welder that does not use the switching module 110 of FIGS. 1-3 in accordance with the method 400 of FIG. 4, or the simpler alternative method described above. As can be seen from the waveform 500 of FIG. 5, after a peak pulse 510 is fired, a short may occur starting at time 520, for example, that lasts until time 530, for example, when the short is cleared The times 520 and 530 define a short interval 540. As can be seen in FIG. 5, peak pulses 510 are fired at regular intervals during the multiple pulse periods or cycles of the welding process. During any given cycle or pulse period, a short condition may or may not occur. In a conventional system, when a short occurs, there is very little resistance in the welding output path compared to the inductance. Current continues to flow even if the power source is turned off.

Referring again to FIG. 5, during the short interval 540, the output current tends to increase due to the lack of an arc between the electrode E and the workpiece W (the resistance becomes very low), and due to the fact that the welding circuit inductance 210 acts to keep current flowing in the welding output path, even when the power converter 120 is phased back to a minimum level. The current tends to increase until the short is cleared (i.e., until the molten metal short breaks free of the electrode E). However, at such increased current levels, when the short breaks or clears, the increased current levels tend to cause the molten metal to explode causing spatter.

FIG. 6 illustrates the exploding spatter process that was discovered using high speed video technology in a free-flight transfer process having a tethered connection. A high peak pulse (e.g., 510) causes a ball of molten metal 610 to push out towards the workpiece W creating a narrow tether 620 between the ball 610 and the electrode E. As the ball 610 flies toward the workpiece W across the arc, the tether 620 narrows and, eventually, a short occurs between the electrode E and the workpiece W through the tether 620. This condition tends to occur for almost every pulse period in an operation where the welding electrode operates very close to the workpiece. In particular, it was discovered that for a free-flight transfer pulse welding process, the tether 620 creates an incipient short and a large amount of current can begin to flow through the narrow tether 620. The increasing current level finally causes the relatively thin molten tether 620 to explode creating spatter 630 as shown in FIG. 6. However, by incorporating the switching module 110 and the method 400 (or the simpler alternative) as described above herein, the spatter 630 that is created can be greatly reduced.

Figure 7:
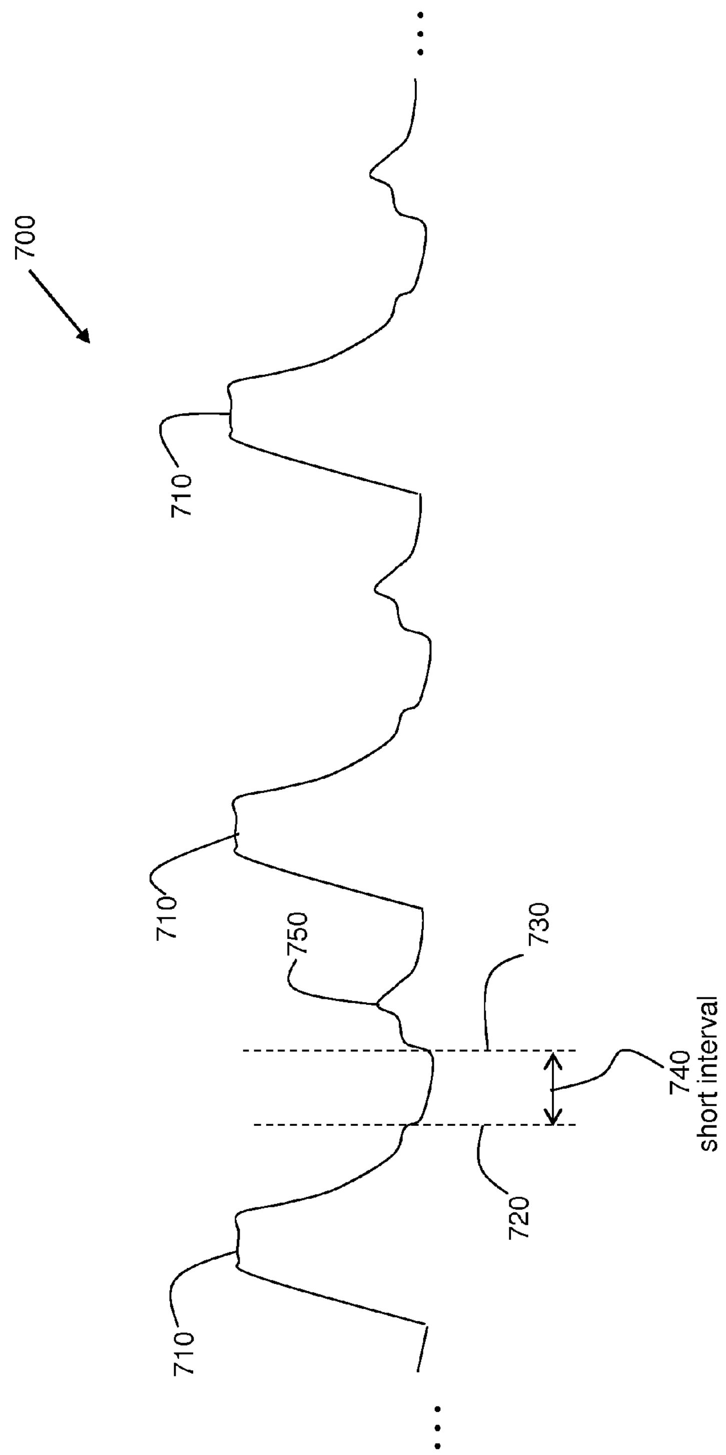
FIG. 7 illustrates an example of a pulsed output current waveform resulting from the pulsed electric arc welder of FIG. 1 that does use the switching module of FIGS. 1-3 in accordance with the method of FIG. 4.

FIG. 7 illustrates an example of a pulsed output current waveform 700 resulting from the pulsed electric arc welder 100 of FIG. 1 that uses the switching module 110 of FIGS. 1-3 in accordance with the method 400 of FIG. 4. As can be seen from the waveform 700 of FIG. 7, after a peak pulse 710 is fired, a short may occur starting at time 720, for example, that lasts until time 730, for example, when the short is cleared. The times 720 and 730 define a short interval 740. As can be seen in FIG. 7, peak pulses 710 are fired at regular intervals during the multiple pulse periods or cycles of the welding process. During any given cycle, a short condition may or may not occur. However, when the distance between the tip of the electrode and the workpiece is relatively small, a short can occur on almost every cycle.

Referring again to FIG. 7, during the short interval 740, the switch 111 of the switching module 110 is opened when the short first occurs and again when the short is about to clear, causing the output current to flow through the resistive path 112 and, therefore, causing the current level to reduce. As an example, the switching signal 172 may be a logic signal that goes from high to low when a short is detected, causing the switch to open. Similarly, when the short is cleared, the switching signal 172 may go from low to high to close the switch 111 again. When the switch 111 is opened, the resistive path 112 puts a load on the welding output path allowing the freewheeling current to drop quickly to desired levels. The current tends to reduce until the short is cleared and, at such reduced current levels, when the short breaks or clears, the molten metal tends to pinch off in an unexplosive manner, eliminating or at least reducing the amount of spatter created. Also, in the waveform 700 of FIG. 7, the plasma boost pulse 750, which is used to help prevent another short from occurring immediately after the short that was just cleared, is more prominent and potentially more effective.

Figure 8:
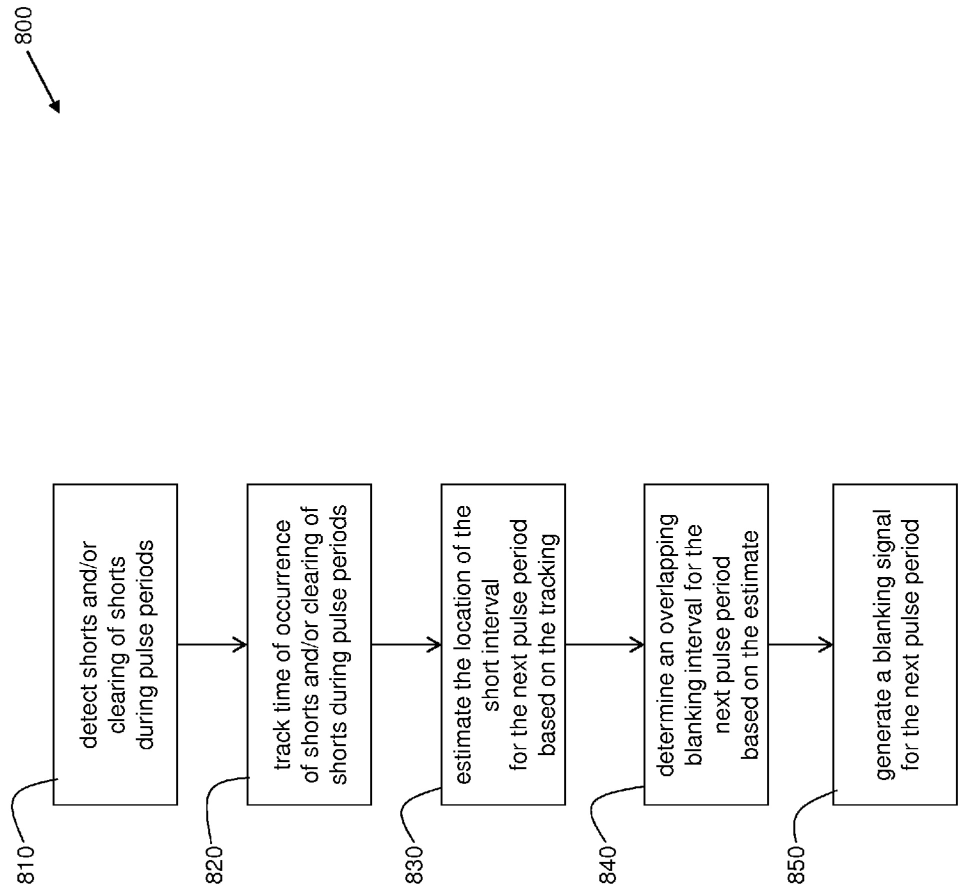
FIG. 8 illustrates a flowchart of another example embodiment of a method for preventing spatter in a pulsed electric arc welding process using the system of FIG. 1.

FIG. 8 illustrates a flowchart of another example embodiment of a method 800 for preventing spatter in a pulsed electric arc welding process using the system 100 of FIG. 1. In accordance with an embodiment, the method 800 is performed by the controller 170. The high-speed controller 170 tracks the times of occurrence of the shorts and/or the clearing of the shorts and provides an estimate of when the short interval 940 (the time between the occurrence of a short and when the short is cleared) (see FIG. 9) will occur during at least the next pulse period. From this estimate, a blanking interval 960 (see FIG. 9) can be determined which is used to generate the blanking signal 172.

In step 810 of the method 800, the system 100 detects the occurrence of shorts and/or the clearing of those shorts during the repeating pulse periods of the pulsed welding waveform, according to known techniques. In step 820, the time of occurrence of the detected shorts and/or clearings within the pulse periods are tracked (e.g., by the high-speed controller 170). In step 830, the location and duration of the short interval 940 (see FIG. 9) for a next pulse period is estimated based on the tracking results. In step 840, an overlapping blanking interval 960 for at least the next pulse period is determined based on the estimated location of the short interval for the next pulse period. In step 850, a blanking signal (a type of switching signal) 172 is generated (e.g., by the controller 170) to be applied to the switching module 110 during the next pulse period.

Figure 9:
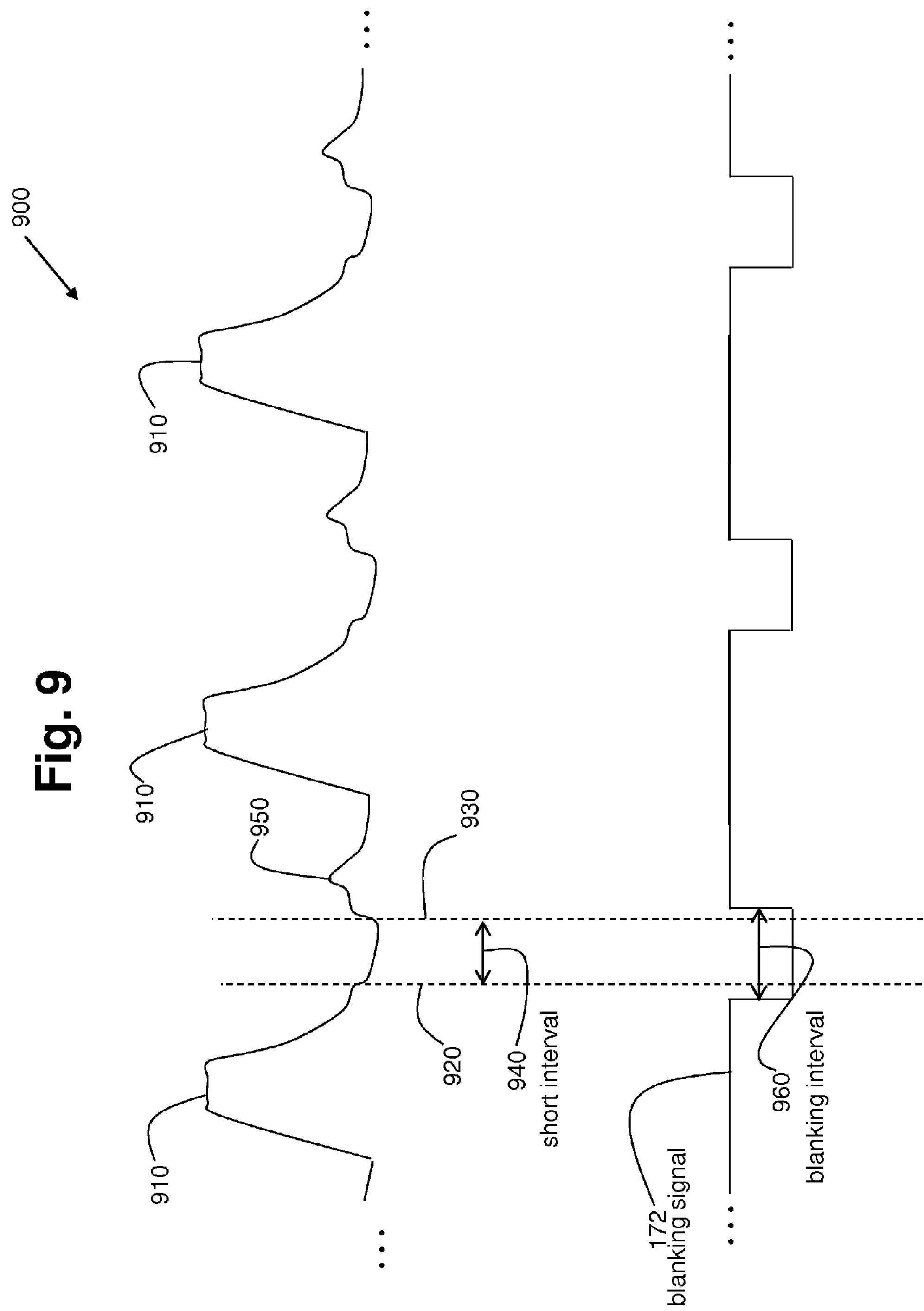
FIG. 9 illustrates an example of a pulsed output current waveform resulting from the pulsed electric arc welder of FIG. 1 that uses the switching module of FIGS. 1-3 in accordance with the method of FIG. 8.

FIG. 9 illustrates an example of a pulsed output current waveform 900 resulting from the pulsed electric arc welder 100 of FIG. 1 that uses the switching module 110 of FIGS. 1-3 in accordance with the method 800 of FIG. 8. As can be seen from the waveform 900 of FIG. 9, after a peak pulse 910 is fired, a short may occur starting at time 920, for example, that lasts until time 930, for example, when the short is cleared. The times 920 and 930 define a short interval 940. As can be seen in FIG. 9, peak pulses 910 are fired at regular intervals during the welding process. During any given cycle, a short condition may or may not occur. However, during a welding process where the arc length is relatively short (i.e., where the wire electrode is operated relatively close to the workpiece), shorts can occur in almost every pulse period.

In accordance with the method 800, the times of occurrence of the short and/or clearing of the short within the pulse period are determined and tracked from pulse period to pulse period. In this manner, the controller 170 may estimate the location of the short interval that will likely occur in the next or upcoming pulse periods. However, at the beginning of a pulsed welding process, before any substantial tracking information is available, the location of the short interval may be a stored default location based on, for example, experimental data or stored data from a previous welding process. The blanking signal 172 can be adapted or modified to form a blanking interval 960 within the blanking signal 172 which temporally overlaps the estimated short interval 940 for the next pulse period(s). Ideally, the blanking interval 960 starts shortly before the short interval 940 of the next pulse period (e.g., before the time 920) and ends shortly after the short interval 940 of the next pulse period (e.g., after the time 930), thus the temporal overlap. In one embodiment, only the times of occurrence of a short are tracked, not the clearing of the shorts. In such an embodiment, the duration of the blanking interval is set to last long enough for the short to clear, based on experimental knowledge.

In this manner, the actual occurrence of a short during the next pulse period does not have to be detected before the switch 111 of the switching module 110 can be opened. As the pulsed welding process progresses, the location of the short interval may drift or change as the distance between the wire electrode and the workpiece drifts or changes, for example. However, in this embodiment, since the location of the short interval is being tracked over time, the location of the blanking signal can be adapted to effectively follow and anticipate the short interval. By opening the switch 111 during the blanking interval 960, the current drops and it is expected that the tether will occur and break during the blanking interval 960.

Experimental results have shown that, using the switching module 110 as described herein in a particular pulsed welding scenario, the welding output current level at the point of clearing the short can be reduced from about 280 amps to about 40 amps, making a tremendous difference in the amount of spatter produced. In general, reducing the current below 50 amps seems to significantly reduce spatter. In addition, travel speeds (e.g., 60-80 inches/minute) and deposition rates are able to be maintained.

Other means and methods of reducing the welding output current level during the time period when a short is present between a welding electrode and a workpiece are possible as well. For example, in an alternative embodiment, the control topology of a welding power source may be configured to control the output current to a highly regulated level during the time of the short. The power source can control the shorting current to a lower level (e.g., below 50 amps) during a shorting interval to reduce the spatter. For example, referring to FIG. 1, the switching module 110 can be disabled or eliminated, allowing current to freely flow in the welding output circuit path. The controller 170 is configured to command the waveform generator 180 to modify a portion of the output welding waveform signal 181 of the welding process during the blanking interval to reduce the welding output current through the welding output circuit path. Therefore, in this alternative embodiment, the controller 170 reduces the current during the blanking interval through the waveform generator 180 and the power converter 120, instead of via the switching module 110. Such an alternative embodiment can work quite well if the inductance 210 of the welding circuit is sufficiently low.

In summary, an electric arc welder and a method for performing a pulse welding process producing reduced spatter are disclosed. The welder produces a current between an advancing electrode and a workpiece. The welder includes a short-detecting capability for detecting a short condition upon occurrence of a short circuit between the advancing electrode and the workpiece. The welder is controlled to reduce the current between the advancing electrode and the workpiece during the time of the short to reduce spatter of molten metal when the short clears.

An embodiment of the present invention comprises a method for reducing spatter in a pulsed arc-welding process. The method includes tracking times of occurrence of short intervals during pulse periods of a pulsed arc-welding process using a controller of a welding system. The tracking may be based on at least one of detecting occurrences of shorts during pulse periods of the pulsed welding process and detecting clearing of shorts during pulse periods of the pulsed welding process. The method further includes estimating a temporal location of a short interval for at least a next pulse period of the pulse welding process based on the tracking. The method also includes determining a blanking interval for at least a next pulse period based on the estimating. The method may further include generating a blanking signal for at least a next pulse period based on the blanking interval. The method may further include increasing a resistance of a welding circuit path of the welding system during the blanking interval in response to the blanking signal to reduce a welding current through the welding circuit path during the blanking interval. Increasing the resistance may include opening an electrical switch of a switching module disposed in the welding circuit path. In accordance with an embodiment, the electrical switch is in parallel with a resistive path within the switching module. The method may include reducing a welding current through a welding circuit path of the welding system during the blanking interval for at least a next pulse period by modifying a portion of a waveform of the welding process during the blanking interval, wherein the waveform is generated by a waveform generator of the welding system. In accordance with an embodiment, the blanking interval is temporally wider than and temporally overlaps an expected short interval of at least a next pulsed period.

An embodiment of the present invention comprises a system for reducing spatter in a pulsed arc-welding process. The system includes a controller configured for tracking times of occurrence of short intervals during pulse periods of a pulsed arc-welding process of a welding system. The controller is further configured for estimating a temporal location of a short interval for at least a next pulse period of the pulsed welding process based on the tracking. The controller is also configured for determining a blanking interval for at least a next pulse period based on the estimating. The controller may also be configured for generating a blanking signal for at least a next pulse period based on the blanking interval. In accordance with an embodiment, the blanking interval is temporally wider than and temporally overlaps an expected short interval of at least a next pulse period. The system may further include a switching module disposed in a welding circuit path of the welding system and operatively connected to the controller. The switching module is configured to increase a resistance of the welding circuit path of the welding system during the blanking interval in response to the blanking signal to reduce a welding current through the welding circuit path during the blanking interval. The switching module includes an electrical switch and a resistive path in parallel. The controller may be configured for commanding a waveform generator of the welding system to reduce a welding current through a welding circuit path of the welding system during the blanking interval for at least a next pulse period by modifying a portion of a waveform of the welding process during the blanking interval. The controller may further be configured to detect occurrences of shorts during pulse periods of the pulsed welding process, and to detect occurrences of clearing of shorts during pulse periods of the pulsed welding process.

An embodiment of the present invention comprises a method for reducing spatter in a pulsed arc-welding process. The method includes detecting a short during a pulse period of a pulsed arc-welding process using a controller of a welding system. The method further includes increasing a resistance of a welding circuit path of the welding system for a first period of time to reduce a welding current through the welding circuit path in response to detecting the short. The method also includes decreasing the resistance of the welding circuit path of the welding system for a second period of time immediately after the first period of time to increase the welding current through the welding circuit path. The method further includes increasing the resistance of the welding circuit path of the welding system for a third period of time immediately after the second period of time to reduce the welding current through the welding circuit path in anticipation of clearing the short. Increasing the resistance may include opening an electrical switch of a switching module disposed in the welding circuit path. Decreasing the resistance may include closing an electrical switch of a switching module disposed in the welding circuit path. The method may further include detecting that a short has cleared, and decreasing the resistance of the welding circuit path of the welding system in response to detecting that the short has cleared.

An embodiment of the present invention comprises a method for reducing spatter in a pulsed arc-welding process. The method includes detecting a short between a workpiece and an advancing wire electrode during a pulse period of a pulsed arc-welding process using a controller of a welding system. The method further includes decreasing a current of a welding circuit path of the welding system for at least a portion of a determined period of time in response to detecting the short wherein, during most pulse periods of the pulsed arc-welding process, the determined period of time is of a duration allowing for the short to clear without having to first increase the current of the welding circuit path. Decreasing the current may include increasing a resistance of the welding circuit path. Increasing the resistance may include opening an electrical switch of a switching module disposed in the welding circuit path, wherein the switching module includes the electrical switch in parallel with a resistance path. The method may further include increasing the current of the welding circuit path of the welding system immediately after the determined period of time if the short has not cleared. Increasing the current may include decreasing a resistance of the welding circuit path. Decreasing the resistance may include closing an electrical switch of a switching module disposed in the welding circuit path, wherein the switching module includes the electrical switch in parallel with a resistance path. The method may further include slowing down a speed of the advancing wire electrode in response to detecting the short between the electrode and the workpiece. Slowing down the speed of the advancing wire electrode may include switching off a motor of a wire feeder advancing the wire electrode and applying a brake to the motor. The brake may be a mechanical brake or an electrical brake, in accordance with various embodiments.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method for reducing spatter in a welding process, said method comprising:

conducting a free-flight transfer pulsed arc-welding process using a welding system;

detecting a short between a workpiece and an advancing wire electrode during a pulse period of the free flight transfer pulsed arc-welding process using a controller of a welding system;

decreasing a current of a welding circuit path of the welding system in response to detecting the short;

maintaining the decreased current for a first period of time during a short interval, wherein the short clears while the current is decreased; and increasing the current of the welding circuit path of the welding system for a second period of time after the short clears.

2. The method of claim 1, wherein decreasing the current includes increasing a resistance of the welding circuit path.

3. The method of claim 2, wherein said increasing a resistance includes opening an electrical switch of a switching module disposed in the welding circuit path, wherein said switching module includes said electrical switch in parallel with a resistance path.

4. The method of claim 1, wherein increasing the current includes decreasing a resistance of the welding circuit path.

5. The method of claim 4, wherein said decreasing a resistance includes closing an electrical switch of a switching module disposed in the welding circuit path, wherein said switching module includes said electrical switch in parallel with a resistance path.

6. The method of claim 1, further comprising slowing down a speed of the advancing wire electrode in response to detecting the short between the electrode and the workpiece.

7. The method of claim 6, wherein slowing down a speed of the advancing wire electrode includes switching off a motor of a wire feeder advancing the wire electrode and applying a brake to the motor.

8. The method of claim 7, wherein said brake is one of a mechanical brake or an electrical brake.

9. The method of claim 1, further comprising:

further increasing the current of the welding circuit path of the welding system after the short clears to prevent another short from forming.

10. The method of claim 9, wherein detecting when the short clears includes a dv/dt detection scheme.

11. The method of claim 9, wherein increasing the current of the welding circuit path of the welding system after the short clears comprises a plasma boost pulse.

12. A system for reducing spatter in a welding process, comprising:

a welding system for conducting a free flight transfer pulsed arc-welding process using, wherein the welding system comprises a controller configured to:

detect a short between a workpiece and an advancing wire electrode during a pulse period of the free flight transfer pulsed arc-welding process;

decrease a current of a welding circuit path of the welding system in response to detecting the short;

maintain the decreased current for a first period of time during a short interval, wherein the short clears while the current is decreased; and increase the current of the welding circuit path of the welding system for a second period of time after the first period of time.

13. The system of claim 12, wherein decreasing the current includes increasing a resistance of the welding circuit path.

14. The system of claim 13, wherein said increasing a resistance includes opening an electrical switch of a switching module disposed in the welding circuit path, wherein said switching module includes said electrical switch in parallel with a resistance path.

15. The system of claim 12, wherein increasing the current includes decreasing a resistance of the welding circuit path.

16. The system of claim 15, wherein said decreasing a resistance includes closing an electrical switch of a switching module disposed in the welding circuit path, wherein said switching module includes said electrical switch in parallel with a resistance path.

17. The system of claim 12, wherein the controller is further configured to slow down a speed of the advancing wire electrode in response to detecting the short between the electrode and the workpiece.

18. The system of claim 17, wherein slowing down a speed of the advancing wire electrode includes switching off a motor of a wire feeder advancing the wire electrode and applying a brake to the motor.

19. The system of claim 18, wherein said brake is one of a mechanical brake or an electrical brake.

20. The system of claim 12, wherein the controller is further configured to further increase the current of the welding circuit path of the welding system after the short clears to prevent another short from forming.

21. The system of claim 20, wherein detecting when the short clears includes a dv/dt detection scheme.

22. The system of claim 20, wherein increasing the current of the welding circuit path of the welding system after the short clears comprises a plasma boost pulse.

23. A system for reducing spatter in a welding process, comprising:

means for conducting a free flight transfer pulsed arc-welding process;

means for detecting a short between a workpiece and an advancing wire electrode during a pulse period of the free flight transfer pulsed arc-welding process;

means for decreasing a current of a welding circuit path of the welding system in response to detecting the short;

means for maintaining the decreased current for a first period of time during a short interval, wherein the short clears while the current is decreased; and means for increasing the current of the welding circuit path of the welding system for a second period of time after the short clears.

* * * * *